Patented Apr. 15, 1930

1,754,797

UNITED STATES PATENT OFFICE

CLAUDE G. MINER, OF BERKELEY, CALIFORNIA

PROCESS OF PRODUCING ANHYDROUS ALUMINUM HALIDE FROM A DOUBLE HALIDE OF ALUMINUM AND AMMONIUM

No Drawing. Application filed June 28, 1926. Serial No. 119,234.

This invention relates to a process for the commercial production of anhydrous aluminum halides from double halides of aluminum and ammonium and is more particularly directed to a process for the commercial production of anhydrous aluminum chloride and certain nitrogen by-products.

The catalytic properties of anhydrous aluminum chloride for cracking oil are generally known. The use of anhydrous aluminum halides or chlorides as a catalytic agent for cracking oils has heretofore been limited because of the cost of preparing or producing these anhydrous aluminum halides at a price where these catalytic agents could be employed in cracking processes to compete with other known methods of cracking oil.

It is the principal object of this invention to produce a commercially practical method by which anhydrous aluminum halides and certain nitrogen by-products may be produced from aluminum nitride to give the anhydrous aluminum halide in a high state of purity and fixed nitrogen compounds.

Another object of this invention is to provide a commercially practical method of producing anhydrous aluminum chloride and certain nitrogen by-products in such a manner that the nitrogen by-products produced will partially or wholly pay the costs of operation and production of the anhydrous chloride so that the anhydrous aluminum chloride may be produced at a cost low enough to enable the same to be used in cracking processes in competition with other known cracking processes.

It is generally known that a dry halide acid gas will decompose aluminum nitride at about 1000° C. to produce a double halide of aluminum and ammonium in accordance with the following equation:

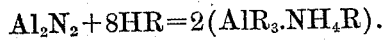

For the production of the double chloride from aluminum nitride in accordance with this known reaction, the equation is:

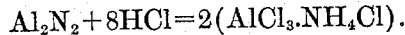

It has been found, however, that the resultant double halide or double chloride of aluminum and ammonium is extremely stable and that the aluminum halide or chloride is difficult to obtain therefrom. It has also been found that the aforesaid double halide will not crack oil. It has also been found that if the aluminum chloride and ammonium chloride are mixed in different ratios and tested for cracking oil that in each case one gram molecular weight of ammonium chloride will remove one gram molecular weight of aluminum chloride from catalytic activity. Therefore, since about 53 parts of ammonium chloride removes 133 parts, or thereabouts, of aluminum chloride from catalytic activity, it is desirable that the aluminum chloride or aluminum halide be purified or separated from the ammonium chloride or ammonium halide to the highest degree possible.

I have discovered that under proper conditions certain metathesis agents can be employed to treat the double halide of aluminum and ammonium and produce thereby a high grade aluminum halide. This metathesis agent must be such that during the process the resultant compounds formed in addition to the aluminum halide do not form a complex compound with the said aluminum halide or if such complex compound be formed with the aluminum halide that the aluminum halide is easily separated therefrom.

I have discovered that the phosphorus halides, such for example, as phosphorus pentachloride or the sulfide of phosphorus, provides a metathesis agent extremely well adapted for the production from the double halide of aluminum and ammonium of a high grade aluminum halide. When a phosphorus halide is employed as a metathesis agent the reaction is in accordance with the following equation:

In the case of the preparation and use of the chloride, the reaction is:

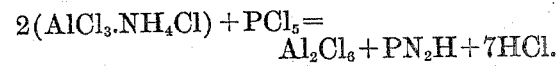

In these equations, R is employed to denote the halogen radical. It will be noted that in accordance with the above equations that approximately one gram molecular weight of phosphorus halide is mixed with two gram molecular weights or thereabouts of the double halide of aluminum and ammonium. However, I prefer to carry out this process using an excess of phosphorus halide in order that the conversion of the double halide to the anhydrous aluminum halide may be practically complete.

I have found that when, for example, the double chloride of aluminum and ammonium is mixed with phosphorus pentachloride in the aforesaid ratio or thereabouts, that there is formed a liquid at a little above room temperature, at which temperature the reaction starts, as is evidenced by the evolution of hydrochloric acid gas. In carrying out this process, the temperature is gradually raised to a dull red heat, whereby the last of the aluminum chloride is driven off in the form of a vapor or gas.

The phospham ($PN_2H$) formed during this reaction is a non-volatile and non-decomposable substance at the temperature and under the conditions employed for carrying out this process and it will therefore be apparent that as the aluminum chloride or halide is driven off from the resultant or residual phospham, that the aluminum halide or chloride will be produced in a high state of purity. The aluminum chloride or halide is condensed preferably in a separate container after the same is volatilized off from the phospham and the hydrochloric acid gas evolved during the reaction will remain gaseous during the condensation of the aluminum chloride and may be separately recovered or used in the gaseous state as desired.

I have also found that it is advantageous during the carrying out of this process to conduct or pass over the mass a quantity of dry hydrochloric acid gas and the reaction will proceed more efficiently when such a hydrochloric acid gas is employed. However, the use of this hydrochloric acid gas is not an essential feature of my invention.

The following equation is representative of the reaction taking place when the sulfide of phosphorus is employed as a metathesis agent:

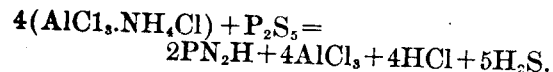

$$4(AlCl_3 \cdot NH_4Cl) + P_2S_5 = 2PN_2H + 4AlCl_3 + 4HCl + 5H_2S.$$

I have also discovered that the reactions may be made to proceed with the ammonium aluminum halides in a liquid, solid or gaseous state. For example, I have volatilized the double chloride of aluminum and ammonium and then brought this in contact with phosphorous pentachloride vapors and found that the said substances reacted in substantially the same manner as when massed in the solid or liquid state and heated as aforesaid. Therefore, I believe and prefer, for reasons of easier operation, that it would be more advantageous to carry out this reaction by mixing the ingredients in the solid state and then heating the same to the proper temperatures as above set forth.

I have discovered that in carrying out the aforesaid process of producing an aluminum halide from aluminum nitride, that a great saving may be had by first producing the double aluminum and ammonium halide from the aluminum nitride and adding to the reaction chamber, in which the reaction between the dry hydrochloric acid gas and aluminum nitride has taken place, the metathesis agent, such as the phosphorus halide, immediately after or during the formation of the double halide of ammonium and aluminum, thereby conserving heat and reducing the cost of operation of this process.

It will be evident that chlorine and hydrogen, or a gas containing hydrogen, such as water gas, may be used instead of the hydrochloric acid for decomposition of the nitride as the chlorine and hydrogen will form hydrochloric acid at the temperatures employed.

I have also discovered that by introducing the metathesis agent, such as phosphorus halide into the reaction chamber wherein the double halide of ammonium and aluminum is being produced in a vapor or gaseous state at an elevated temperature, that the reaction to form the anhydrous aluminum halide may be carried out without adding substantially any heat to the reaction chamber for the formation of the anhydrous aluminum halide.

Having fully described my invention, it is to be understood that I do not wish to be limited to the exact details herein set forth, which may obviously be varied without departing from the spirit and scope of my invention as defined by the appended claims.

I claim:

1. A process of producing an anhydrous aluminum halide which comprises reacting a double halide of aluminum and ammonium with a phosphorus halide metathesis agent at an elevated temperature to produce anhydrous aluminum halide vapor and a non-volatile residue.

2. A process of producing an anhydrous aluminum halide which consists in first forming a double halide of aluminum and ammonium by treating an aluminum nitride at approximately a red to white heat with dry hydrochloric acid gas and thereafter bringing about a reaction between the double halide so formed and a compound of phosphorous and a non-metal capable of liberating anhydrous aluminum halide in a high state of purity.

3. A process of producing an anhydrous aluminum salt which comprises reacting a double halide of aluminum and ammonium with a metathesis agent at an elevated temperature in accordance with the reaction:

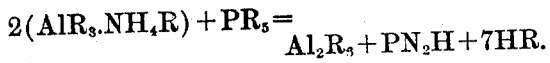

4. A process of producing an anhydrous aluminum chloride which comprises reacting a double chloride of aluminum and ammonium with a metathesis agent at an elevated temperature in accordance with the reaction:

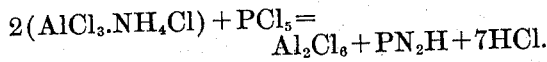

5. A process of producing an anhydrous aluminum halide which consists in first forming a double halide of aluminum and ammonium by treating aluminum nitride with a halogen acid gas at an elevated temperature, and thereafter bringing about a reaction between the double halide of aluminum and ammonium with a compound of phosphorous and a non-metal at an elevated temperature to form a volatile aluminum halide and a non-volatile residuant compound.

6. A process of producing an anhydrous aluminum halide which comprises first forming a double halide of aluminum and ammonium by treating aluminum nitride with a halogen acid gas at approximately 1000° C. and thereafter bringing about a reaction between the said double halide and a compound of phosphorous and a non-metal capable of liberating the aluminum halide in a high state of purity and then volatilizing off the aluminum halide.

7. A process of producing an anhydrous aluminum chloride which consists in forming a double salt of aluminum and ammonium by treating aluminum nitride with an acid of the halogen series at an elevated temperature and thereafter bringing about a reaction between the double salt of aluminum and ammonium with a compound of phosphorous and a non-metal capable of liberating the aluminum chloride in a high state of purity.

8. A process of producing an anhydrous aluminum chloride which consists in treating aluminum nitride at an elevated temperature with hydrochloric acid gas and a compound of phosphorous and a non-metal capable of liberating aluminum chloride in a high state of purity.

9. A process of producing an anhydrous aluminum chloride which consists in treating aluminum nitride with hydrochloric acid gas at approximately 1000° C. and thereafter bringing about a reaction between the double chloride produced thereby and a compound of phosphorous and a non-metal capable of changing the double chloride into a state whereby aluminum chloride in a high state of purity can be extracted from the residual compounds formed with the metathesis agent.

10. A process of producing an anhydrous aluminum chloride which consists in first forming a double chloride of aluminum and ammonium by treating aluminum nitride with hydrochloric acid gas at approximately 1000° C. and thereafter treating said resultant double chloride with phosphorous pentachloride at an elevated temperature.

11. A process of producing an anhydrous aluminum chloride which consists in first forming a double chloride of aluminum and ammonium by treating aluminum nitride with hydrochloric acid gas at approximately 1000° C. and thereafter treating said resultant double chloride with phosphorous pentachloride at an elevated temperature and then gradually raising the temperature of the mass to a dull red heat.

12. A process of producing an anhydrous aluminum chloride which consists in first forming a double chloride of aluminum and ammonium by treating aluminum nitride with hydrochloric acid gas at approximately 1000° C. and thereafter treating said resultant double chloride with phosphorous pentachloride in the approximate ratio of two parts by-weight of phosphorous pentachloride to one by-weight of the ammonium chloride content of the double chloride of aluminum and ammonium and gradually raising the temperature of the mass to a red heat.

13. A process of producing an anhydrous aluminum chloride which consists in reacting a double halide of aluminum and ammonium with a compound of phosphorous and a non-metal at an elevated temperature and in the presence of an acid gas of the halogen series to produce anhydrous aluminum halide vapor and a non-volatile residue.

14. A process of producing an anhydrous aluminum halide which comprises reacting a double halide of aluminum and ammonium with an excess of a phosphorus halide metathesis agent at an elevated temperature to produce anhydrous aluminum chloride vapor and a non-volatile residue.

Signed at San Francisco this 16th day of June, 1926.

CLAUDE G. MINER.